(12) United States Patent
Franzen

(10) Patent No.: US 11,573,209 B2
(45) Date of Patent: Feb. 7, 2023

(54) METHODS AND SYSTEMS FOR ADAPTIVE ACCURACY CONTROL OF ULTRASONIC NON-DESTRUCTIVE TESTING DEVICES

(71) Applicant: Baker Hughes Oilfield Operations LLC, Houston, TX (US)

(72) Inventor: Andreas Franzen, Hurth (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/697,033

(22) Filed: Mar. 17, 2022

(65) Prior Publication Data

US 2022/0205958 A1    Jun. 30, 2022

Related U.S. Application Data

(63) Continuation of application No. 16/836,435, filed on Mar. 31, 2020, now Pat. No. 11,320,406.

(51) Int. Cl.
*G01N 29/30* (2006.01)
*G01N 21/93* (2006.01)
*G01N 29/26* (2006.01)

(52) U.S. Cl.
CPC ............. *G01N 29/30* (2013.01); *G01N 21/93* (2013.01); *G01N 29/26* (2013.01)

(58) Field of Classification Search
CPC ........ G01N 29/30; G01N 21/93; G01N 29/26; G01N 29/265; G01N 2291/048; G01N 2291/102; G01N 29/225
See application file for complete search history.

(56) References Cited

U.S. PATENT DOCUMENTS

| | | | |
|---|---|---|---|
| 2012/0320372 A1* | 12/2012 | Troy | B64F 5/60 356/237.2 |
| 2013/0145850 A1* | 6/2013 | Lute, Jr. | G01N 29/043 901/44 |
| 2016/0341700 A1* | 11/2016 | Schroeder | G01N 29/265 |
| 2019/0204239 A1* | 7/2019 | Ringlien | G01B 21/042 |
| 2020/0141908 A1* | 5/2020 | Bingham | G01N 29/265 |

* cited by examiner

*Primary Examiner* — Xin Y Zhong
(74) *Attorney, Agent, or Firm* — Mintz Levin Cohn Ferris Glovsky and Popeo, PC

(57) ABSTRACT

A non-destructive testing calibration system includes a first multi-axis robotic device having a first end effector, a second multi-axis robotic device having a second end effector. A calibration assembly includes an emitter arranged on the first end effector and a receiver arranged on the second end effector, where the emitter and the receiver exchange a calibration signal between the first robotic device and the second robotic device. A data processor and a memory storing instructions, which when executed causes the data processor to perform operations comprising: performing a calibration scan, where the calibration scan includes a plurality of measurement points along a scan path of the emitter and the receiver; measuring the deviation between the emitter and the receiver at each measurement point along the scan path; and determining a corrected scan path based on the deviation between the emitter and receiver at each measurement point during the calibration scan.

20 Claims, 10 Drawing Sheets

METHODS AND SYSTEMS FOR ADAPTIVE ACCURACY CONTROL OF ULTRASONIC NON-DESTRUCTIVE TESTING DEVICES

CROSS REFERENCE TO RELATED APPLICATIONS

This application is a continuation of, and claims priority to, U.S. patent application Ser. No. 16/836,435, filed Mar. 31, 2020 and entitled "METHODS AND SYSTEMS FOR ADAPTIVE ACCURACY CONTROL OF ULTRASONIC NON-DESTRUCTIVE TESTING DEVICES," the entirety of which is incorporated by reference herein.

BACKGROUND

Non-destructive testing (NDT) involves examining a part without harming the structure or requiring significant disassembly. This type of inspection is advantageous for many applications that require a thorough inspection of the exterior and/or interior of a structure. For example, the aircraft industry uses NDT inspections to inspect aircraft parts for internal and external damage, anomalies, and flaws. Users can perform NDT inspections by manually moving an appropriate sensor over the structure. Examples of NDT inspections can use a variety of sensors including pulse-echo (PE), through-transmission (TT), and shear-wave sensors to obtain data, such as for thickness gauging, detection of laminar anomalies and porosity, and/or crack detection in the part. Manual inspection requires a technician to move the sensor over the structure. Although use of automation (e.g., robots) can remedy many deficiencies of manual inspection, multi-axis robots find little use in NDT inspection to manipulate the sensor relative to the part because of the inability to determine the exact position (relative to the part) of the sensor in real-time. Rather, programs to operate multi-axis robots simply instruct the robot where to go, but not to report the relative position of the sensor. This limitation makes challenging the ability to obtain the position of the sensor with respect to the part as the sensor acquires data. Moreover, the limitations of multi-axis robots are more likely to limit application of these robots in combination with through-transmission (TT) sensors, where the ultrasonic signal from the sensor passes through the part from one robot to another.

SUMMARY

Certain NDT devices can be used to observe the structure of solid objects, such as aircraft parts. Ultrasonic NDT devices can be arranged adjacent to through these solid objects to perform maintenance checks to determine internal defects. Such ultrasonic NDT inspection systems require the ability to be use multi-axis robots to conduct inspections to provide a large inspection envelope to accommodate large parts (e.g., aircraft parts) without the cost, complexity, and limitations of inspection systems that typically translate the sensors using gantry-style linear degrees of freedoms. However, both multi-axis robots are translating in 3-dimensional space separately and need to verify their location to one another to ensure an ultrasonic signal is passing through the part to determine any internal defects. Therefore, it is beneficial to increase the accuracy of an ultrasonic NDT inspection system to both validate and measure defects using ultrasonic waves.

In general, systems and methods are provided for calibrating non-destructive testing inspection systems.

In one embodiment, a non-destructive testing calibration system, can include a first multi-axis robotic device, a second multi-axis robotic device, and a calibration assembly. The first multi-axis robotic device can include a first end effector. The second multi-axis robotic device can include a second end effector. The first multi-axis robotic device can move independent of, and relative to, the second multi-axis robotic device. The calibration assembly can include an emitter arranged on the first end effector, and a receiver arranged on the second end effector. The emitter and the receiver are positioned on opposite sides of the calibration assembly to exchange a calibration signal between the first robotic device and the second robotic device. The system can further include at least one data processor and a memory storing instructions, which when executed by at the least one data processor causes the at least one data processor to perform operations comprising: performing a calibration scan, wherein the calibration scan includes a plurality of measurement points along a scan path of the emitter and the receiver; measuring the deviation between the emitter and the receiver at each measurement point along the scan path; and determining a corrected scan path based on the deviation between the emitter and the receiver at each measurement point during the calibration scan.

In another embodiment, the corrected scan path can include a first corrected spatial location for the emitter and a second corrected spatial location for the receiver for each measurement point along the scan path.

In another embodiment, the emitter can be an ultrasonic transducer and the receiver is an ultrasonic receiver.

In another embodiment, the first end effector and the second end effector can be configured to generate a fluid stream to couple an ultrasonic signal from the emitter to the receiver.

In another embodiment, the emitter can be a laser and the receiver can be an optical sensor.

In another embodiment, the emitter can include a laser-distance sensor and the receiver can include a reflector.

In another embodiment, the emitter can include a laser-distance sensor and a camera, and the receiver can include a reflector and a visual marker.

In another embodiment, the emitter can include a mandrel extending to the receiver, and the receiver can include a linear position sensor.

In another embodiment, the first end effector can be connected to the second end effector via a telescoping rod, wherein the telescoping rod can rotatably coupled to the first end effector via a first rotation sensor and the second end effector via a second rotation sensor.

In another embodiment, the first multi-axis robotic device and the second multi-axis robotic device can have six degrees of freedoms.

In another embodiment, the emitter and the receiver can be configured to be translated along the corrected scan path to inspect a body for a defect.

Methods for calibrating a non-destructive testing system are also provided. In one embodiment, a method can include performing a calibration scan via an emitter and a receiver, where the calibration scan includes a plurality of measurement points along a scan path of the emitter and the receiver, and the emitter is arranged on a first multi-axis robotic device with a first end effector and the receiver is arranged on a second multi-axis robotic device with a second end effector, wherein the first multi-axis robotic device can move independent of, and relative to, the second multi-axis robotic device; measuring the deviation between the emitter and the receiver at each measurement point along the scan path; and determining a first corrected spatial location for the emitter and a second corrected spatial location for the receiver for each measurement point along the scan path based on the deviation between the emitter and the receiver at each measurement point during the calibration scan.

In another embodiment, the corrected scan path can include a first corrected spatial location for the emitter and a second corrected spatial location for the receiver for each measurement point along the scan path.

In another embodiment, the emitter can be an ultrasonic transducer and the receiver is an ultrasonic receiver.

In another embodiment, the first end effector and the second end effector can be configured to generate a fluid stream to couple an ultrasonic signal from the emitter to the receiver.

In another embodiment, the emitter can be a laser and the receiver can be an optical sensor.

In another embodiment, the emitter can include a laser-distance sensor and the receiver can include a reflector.

In another embodiment, the emitter can include a laser-distance sensor and a camera, and the receiver can include a reflector and a visual marker.

In another embodiment, the emitter can include a mandrel extending to the receiver, and the receiver can include a linear position sensor.

In another embodiment, the first end effector can be connected to the second end effector via a telescoping rod, wherein the telescoping rod can rotatably coupled to the first end effector via a first rotation sensor and the second end effector via a second rotation sensor.

In another embodiment, the first multi-axis robotic device and the second multi-axis robotic device can have six degrees of freedoms.

In another embodiment, the emitter and the receiver can be configured to be translated along the corrected scan path to inspect a body for a defect.

BRIEF DESCRIPTION OF THE DRAWINGS

A brief description of each drawing is provided to more sufficiently understand drawings used in the detailed description of the present disclosure.

Figure 1:
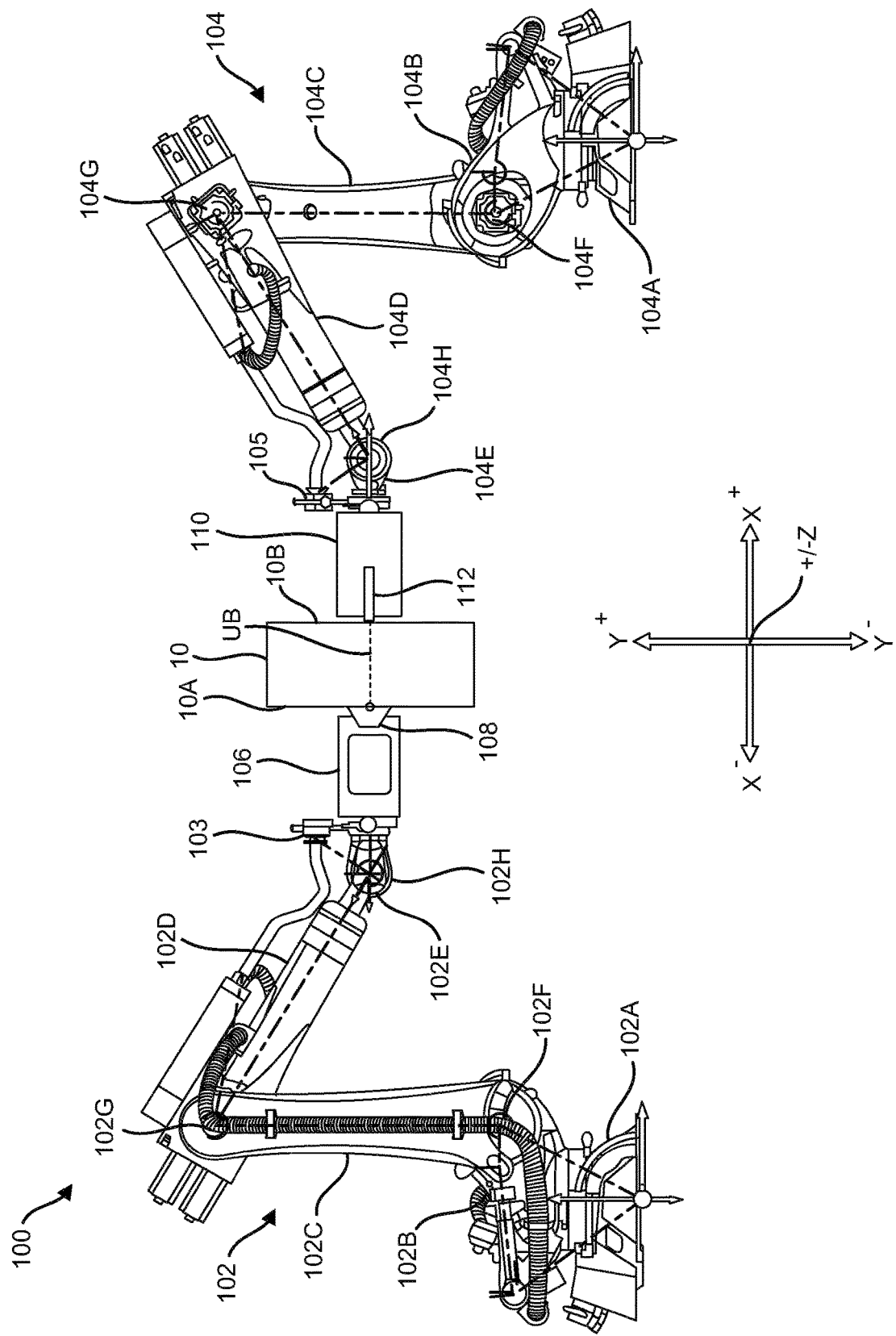
FIG. 1 is a schematic illustration of one exemplary embodiment of a non-destructive testing (NDT) inspection system.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Non-destructive testing systems and devices can be used to inspect a variety of equipment and facilities without destroying the systems and/or devices being inspected. As an example, the NDT systems and devices can include cameras and other measurement devices to detect defects or flaws within a solid body. In some cases, because damage is not visible on the surface of a body, inspection can include techniques that allow the interior of the body to be investigated, such as ultrasonic testing. In ultrasonic testing, ultrasonic probes can be positioned on the body of the part and they can send and receive ultrasonic waves (high frequency sound waves) to detect defects beneath the surface of the body. However, large components, such as aircraft parts, require two robots arranged on either side of the body that must move in sync, with the emitter on one robot, and the receiver on the other.

When ultrasonic testing is performed correctly, ultrasonic waves can easily travel between the ultrasonic probes and the body. This condition, referred to as coupling, and can ensure that defects are accurately measured. However, the scan path which the robots take may not be identical for each robot, causing deviations to occur in the measurement points which make up the scan path. If the scan path is not properly calibrated prior to inspecting a body, the defect measurements acquired by the ultrasonic probes can be inaccurate since the emitter and receiver were not properly aligned.

Accordingly, improved calibration of ultrasonic testing systems and corresponding methods are provided in which each ultrasonic probe is calibrated to ensure the scan path of the emitter and the receiver are aligned prior to inspecting a body with ultrasonic beams.

The present disclosure describes embodiments of a robotic inspection system that inspects a part (also "an asset" and/or "an object") using a pair of multi-axis robots. Inspections may use a variety of tools. For purposes of the present disclosure, ultrasonic tools (i.e., tools that can generate an ultrasonic signal) are used to describe the various features and concepts of the robotic inspections systems. However, artisans skilled in the relevant inspection arts will recognize that other types of tools for scanning parts, e.g., to identify defects and anomalies, are likewise applicable to the robotic inspection system discussed herein. In one embodiment, the robotic inspection system can collect ultrasonic data using opposing ultrasonic tools that can pass an ultrasonic signal through the part from one robot to the other. The multi-axis robots support the ultrasonic tool on a moveable arm that, in combination with other moveable structures of the robot, can manipulate the ultrasonic tool through a plurality of degrees of freedom (e.g., X, Y, Z, pitch, yaw, roll).

The robotic inspection systems also include linear slides or rails that translate the robots independently. In one construction, the robots move parallel to one another while maintaining alignment of the ultrasonic tools sufficient to pass the ultrasonic signal through the part. Tolerances for alignment of the opposing ultrasonic tools for this purpose often cannot exceed more than ±1 mm (or about ±0.003 in) for true position alignment between the tips of the ultrasonic tools on the individual robots. The robotic inspection systems below can meet these requirements and, more particularly, overcome limitations inherent in many types of multi-axis robots, wherein tolerances for the actual location of the end effector on these multi-axis robots may exceed the acceptable limits for alignment of the ultrasonic tools.

Embodiments of the robotic inspection system can also correlate the ultrasonic data to a three-dimensional computer-aided design (CAD) model of the part. This feature permits the embodiments to generate and display the data (e.g., ultrasonic data) as part of, and/or as an overlay to, the CAD model. This feature shows defects and faults within the structure of the part, e.g., cracks, disbands, discontinuities, voids, and porosity, all of which could affect the performance of the part.

FIG. 1 illustrates an exemplary NDT inspection system 100 for use in the inspection systems of the present disclosure. Robots of the type for use as the NDT inspection system 100 are found in industrial settings (e.g., automotive, aircraft, etc.) to automate tasks that would consume substantial human resources. In an exemplary implementation, the NDT inspection system 100 can include multi-axis robotic device 102 and multi-axis robotic device 104. The multi-axis robotic devices 102 and 104 can move independent of, and relative to each other along a linear direction (+/−Z).

The multi-axis robotic device 102 can include a base 102A, a manipulator 102B, a moveable arm 102C, a moveable arm 102D, a moveable arm 102E, and an end effector 106. The multi-axis robotic device 102 also can include joints 102F, 102G, and 102H. These joints permit the components of the multi-axis robotic device 102 to extend and retract relative to the base 102A. In one exemplary implementation, the base 102A can swivel and/or rotate the manipulator 102B and the moveable arm 102C. Collectively, these features afford the robotic devices with movement in multiple axes (or "degrees of freedom"). This movement changes the position of an end effector 106 that affixes to the end of the moveable arm 102E.

The multi-axis robotic device 104 can include a base 104A, a manipulator 104B, a moveable arm 104C, a moveable arm 104D, a moveable arm 104E, and an end effector 110. The multi-axis robotic device 104 also can include joints 104F, 104G, and 104H. These joints permit the components of the multi-axis robotic device 104 to extend and retract relative to the base 104A. In one exemplary implementation, the base 104A can swivel and/or rotate the manipulator 104B and the moveable arm 104C. Collectively, these features afford the robotic devices with movement in multiple axes (or "degrees of freedom"). This movement changes the position of an end effector 110 that affixes to the end of the moveable arm 104E.

Examples of the end effectors 106, 110 can comprise tools and instruments for inspection, including tools that generate ultrasonic signals for performing an ultrasonic scan. In one example, the end effector 106 can mount to the moveable arm 102E in a manner that permits the end effector 106 to be removed and/or re-installed (e.g., to change the type of tool and/or instrument that is on the moveable arm 102E). Additionally, the end effector 110 can mount to the moveable arm 104E in a manner that permits the end effector 110 to be removed and/or re-installed. One type of tool may direct ultrasonic signals onto a part and receives ultrasonic signals, e.g., ultrasonic signals that pass through the part and/or that reflect from surfaces of the material of the part. In the depicted exemplary embodiment of FIG. 1, the end effector 106 includes an ultrasonic receiver 108, and the end effector 110 include an ultrasonic emitter 112. The ultrasonic emitter 112 is configured to emit an ultrasonic beam UB through a part 10 arranged between the end effectors 106 and 110. In an exemplary implementation, the end effectors 106 and 110 can hold one or more tools for use. These tools can affix to the moveable arms 102E and 104E of the robotic devices 102 and 104. Exemplary tools include the ultrasonic tools and devices (e.g., transducers) to perform the ultrasonic scan. Other tools for use with the inspection system 100 may include alignment tools (e.g., a laser, a pointer, etc.) and grippers, although the present disclosure contemplates many different types of tools including tools for use with automated equipment and industrial settings/applications (e.g., found in the aircraft and automotive industries).

For ultrasonic tools like those for use with the NDT inspection system 100, the diagnostic instruments can support various modes of operation. For example, the diagnostic instruments can operate the ultrasonic tools in a single channel mode and in one or more phased array modes, e.g., pulse-echo mode and through-transmission (TT) mode. Artisans skilled in the relevant inspection arts will understand the principle of operation for each of these modes, as well as for the relative construction of the ultrasonic tools to effectuate operation in these various modes.

In an exemplary implementation, a water jet 103 is arranged on the multi-axis robotic device 102 and a water jet 105 is arranged on the multi-axis robotic device 104. During an inspection scan of the part 10, the receiver 108 is arranged adjacent to the surface 10A and the emitter 112 is arranged adjacent to the surface 10B of the part 10. The water jets 103 and 105 can supply water to or an ultrasonic compliant fluid to the space between the receiver 108 and surface 10A and the emitter and surface 10B in order to couple the ultrasonic signal from the tip of the ultrasonic tool to the part surface, and vice versa.

Figure 2:
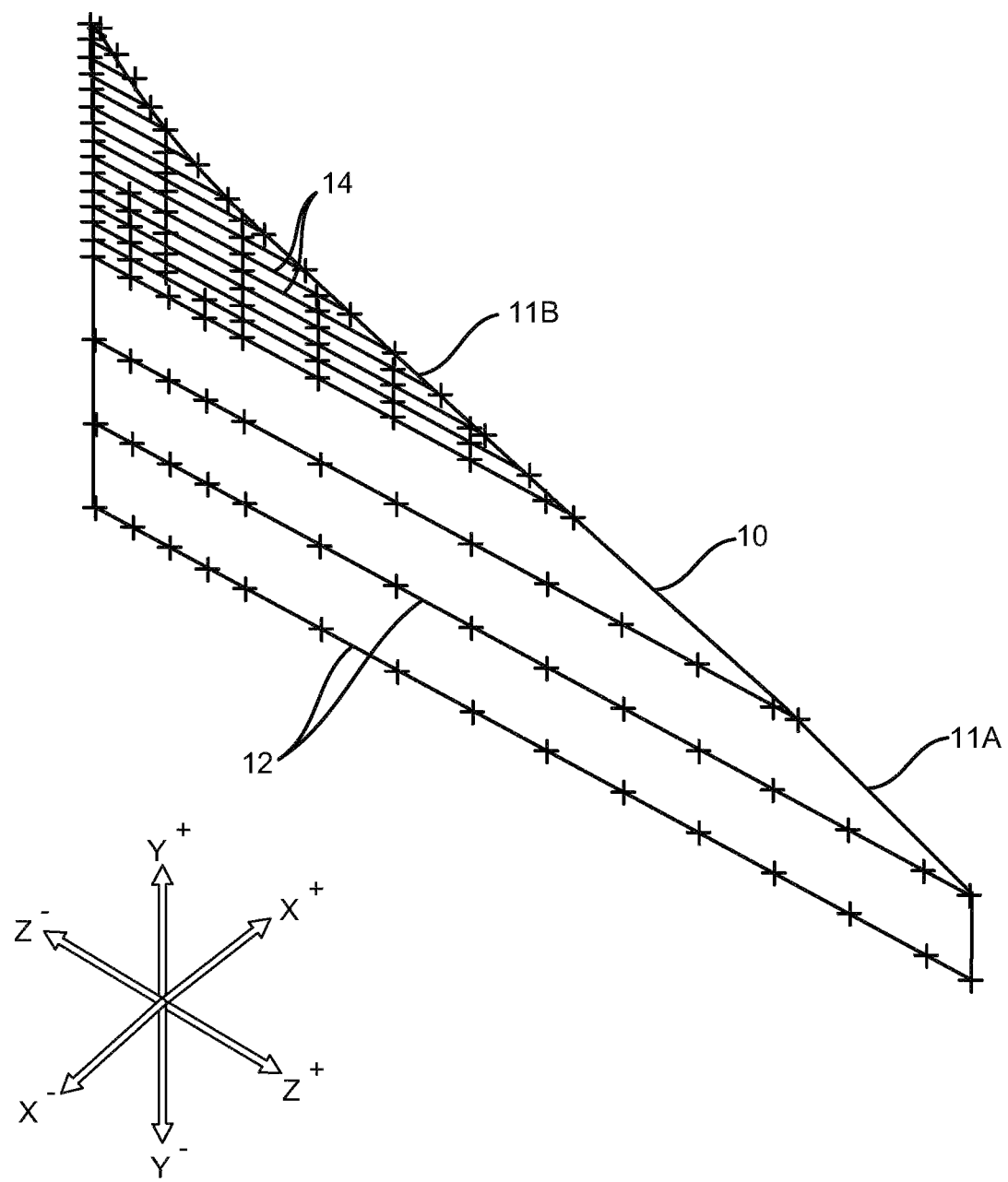
FIG. 2 is a perspective schematic illustration of an inspected component of FIG. 1.
Figure 3:
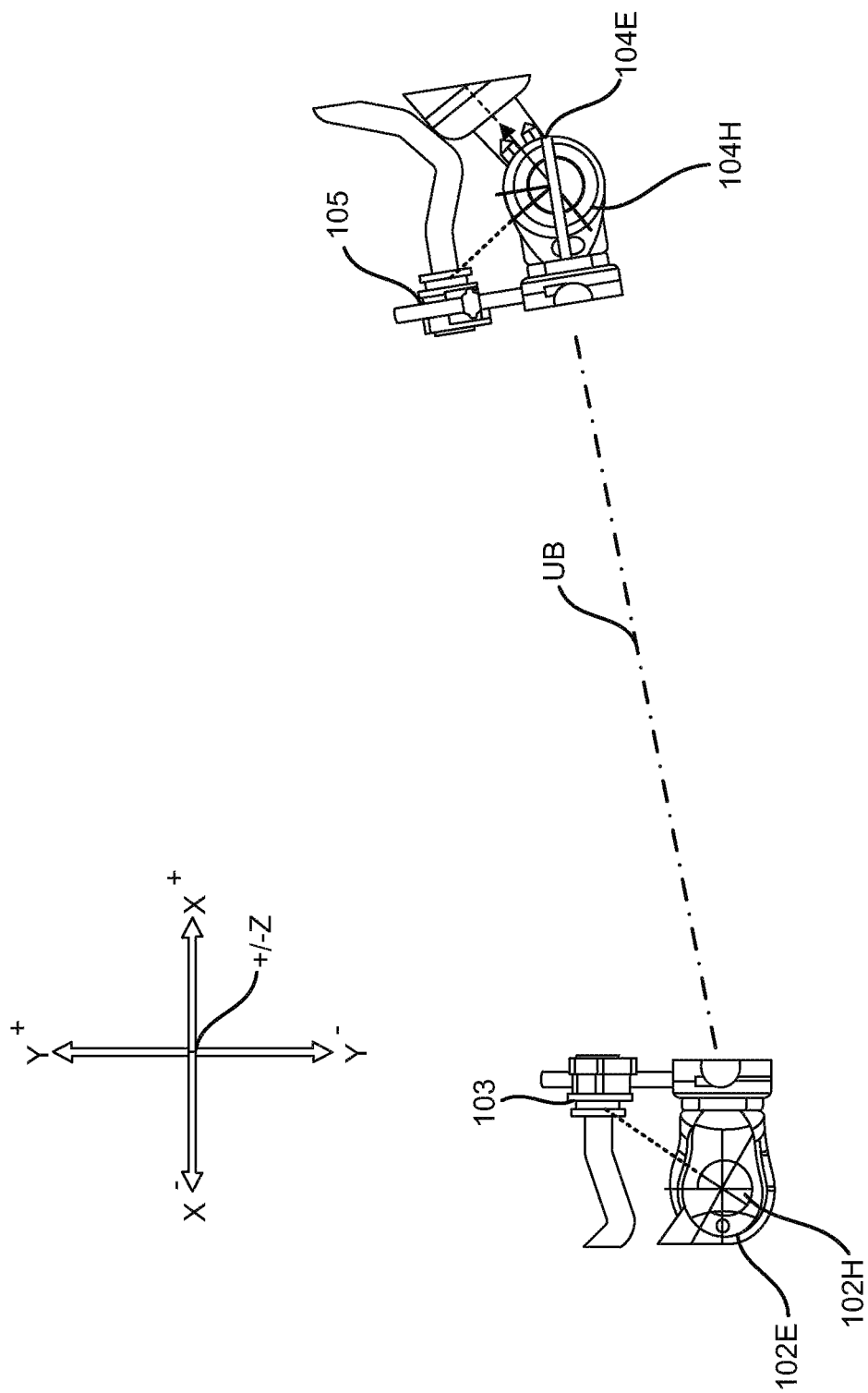
FIG. 3 is a detailed perspective schematic illustration of the NDT inspection system of FIG. 1.

Referring now to FIGS. 2 and 3, the part 10 can be depicted as a plurality of scan paths 12 and 14. In an exemplary implementation, the part 10 includes a low curvature section 11A and a high curvature section 11B. Due to the high amount of curvature in section 11B, the scan paths 14 with the section 11B are more densely arranged to ensure a defect is no missed during an inspection scan. As depicted, the scan paths 12 and 14 include a plurality of measurement points, each having a unique XYZ coordinate position on the part 10. If the receiver 108 and the emitter 112 are not aligned while the multi-axis robotic devices 102 and 104 are translating along a scan path 12 and 14, then a measurement point along the scan paths 12 and 14 will not be measured properly and a defect can be missed at the spatial location of that missed measurement point. An example of misaligned end effectors 106 and 110 is depicted in FIG. 3. As an ultrasonic beam UB is transmitted from the emitter 112 to the receiver 108, the moveable arm 102E is not properly angled on joint 102H so that the ultrasonic beam UB hits the receiver 108 at a 90° angle, which can cause a distorted measurement at this specific measurement point.

Figure 4:
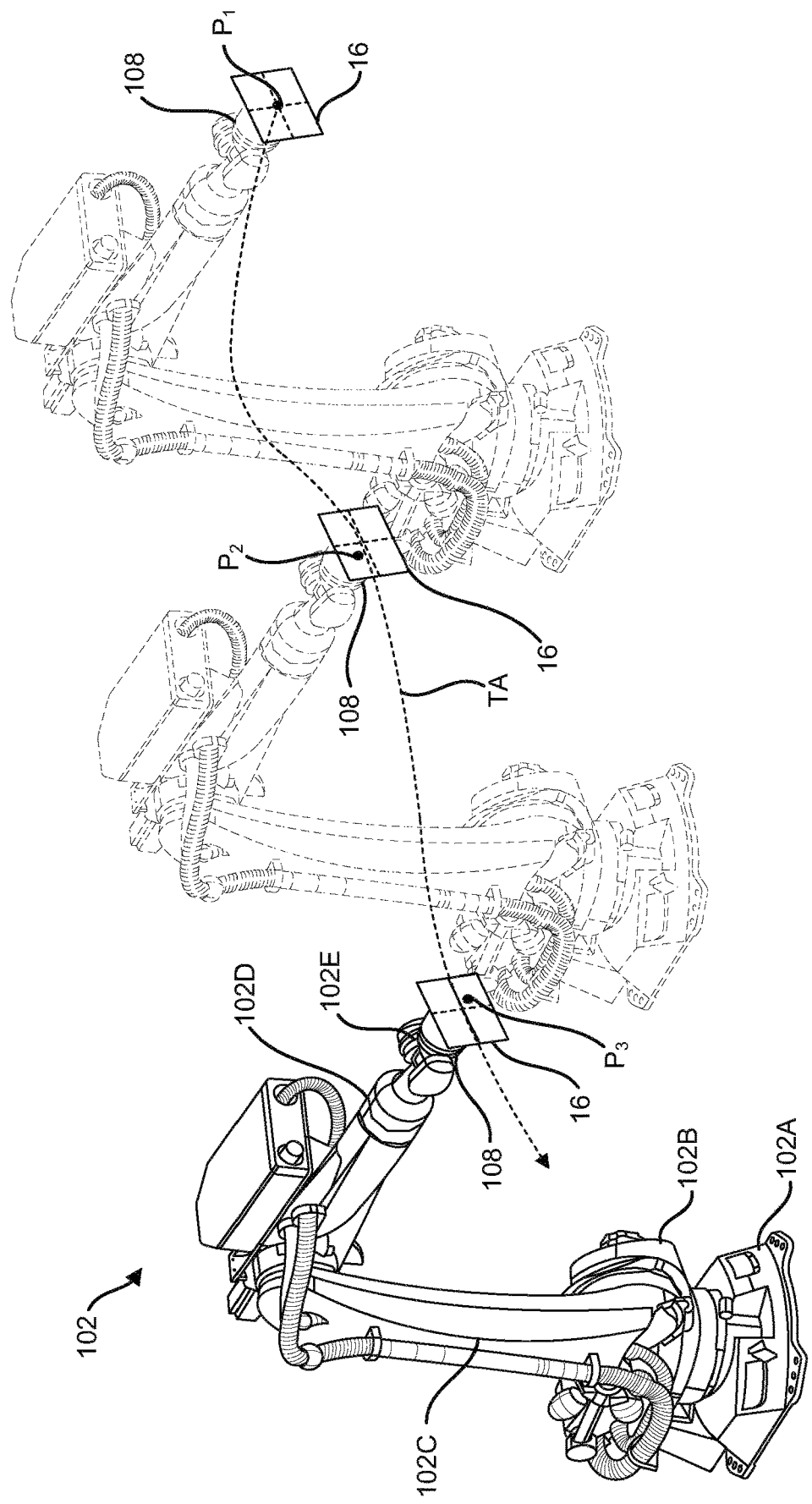
FIG. 4 is a perspective schematic illustration of the NDT inspection system of FIG. 1.

Referring now to FIG. 4, the multi-axis robotic device 102 is depicted translating along a scan path TA of a calibration scan. The multi-axis robotic device 104 is removed for clarity. As the multi-axis robotic device translates along the scan path TA, the measurement points $P_1$, $P_2$, and $P_3$ are measured by the receiver 108. Target 16 is a visual representation of the receiving surface of the receiver 108. As depicted, measurement point $P_1$ is centered on the target 16, meaning that the receiver 108 and the emitter 112 are aligned at the measurement point $P_1$. However, at measurement points $P_2$ and $P_3$, the measurement points are not centered on the target 16, meaning that the receiver is not aligned with the emitter 112. During the calibration scan, this deviation at points $P_2$ and $P_3$ can be saved by a processor and memory in order to determine a corrected scan path where all of the measurement points $P_1$, $P_2$, and $P_3$ are in alignment. The ultrasonic beam received by the receiver 108 from the emitter 112 results in a specific deviation due to the misalignment. This deviation is directly related to the spatial location of the receiver 108 and the emitter 112. The corrected scan path includes the new spatial locations for the receiver 108 and/or emitter 112 in order to align the components.

Figure 5:
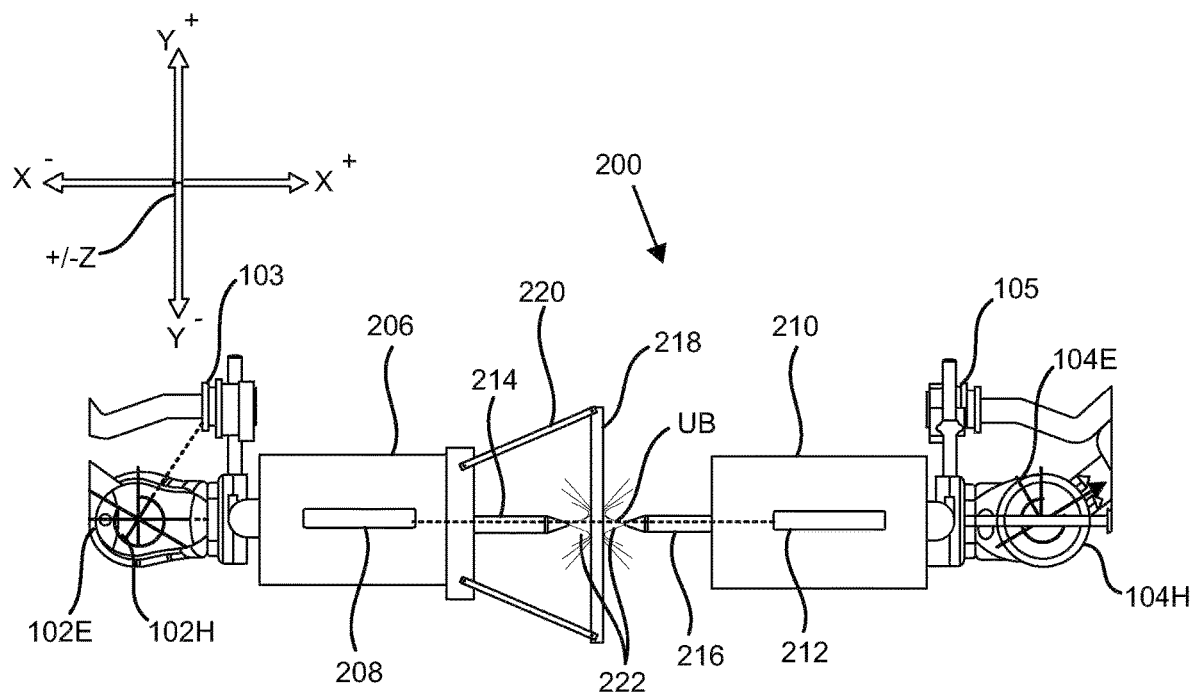
FIG. 5 is a schematic illustration of one exemplary embodiment of a calibration system.

Referring now to FIG. 5, a calibration assembly 200 for the NDT inspection system 100 is depicted. The calibration assembly 200 utilizes ultrasonic beams UB to determine the deviation at measurement points along the scan path. The calibration assembly 200 can include an end effector 206, a receiver 208, an end effector 210, a emitter 212, a fluid nozzle 214, a fluid nozzle 216, a splash plate 218, and brackets 220. As the end effectors 206 and 210 translate along the scan path, an ultrasonic beam UB is emitted from the emitter 212 to the receiver 208. In order to emit the ultrasonic beam UB from the end effector 210 to the end effector 206, an ultrasonic compliant fluid 222, such as water, is ejected from the fluid nozzles 214 and 216. The fluid 222 leaving the fluid nozzles 214 and 216 contact the splash plate 218, which is secured to the end effector 206 via brackets 220. Due to the fluid 222, the ultrasonic beam UB is able to translate from the emitter 212 to the receiver 208. If during the calibration scan either of the end effectors 206 or 210 become misaligned, the ultrasonic beam UB will not be received by the receiver 208 at a threshold amount, causing the calibration assembly 200 to record the deviation at that measurement point in order to create the corrected scan path.

Figure 6:
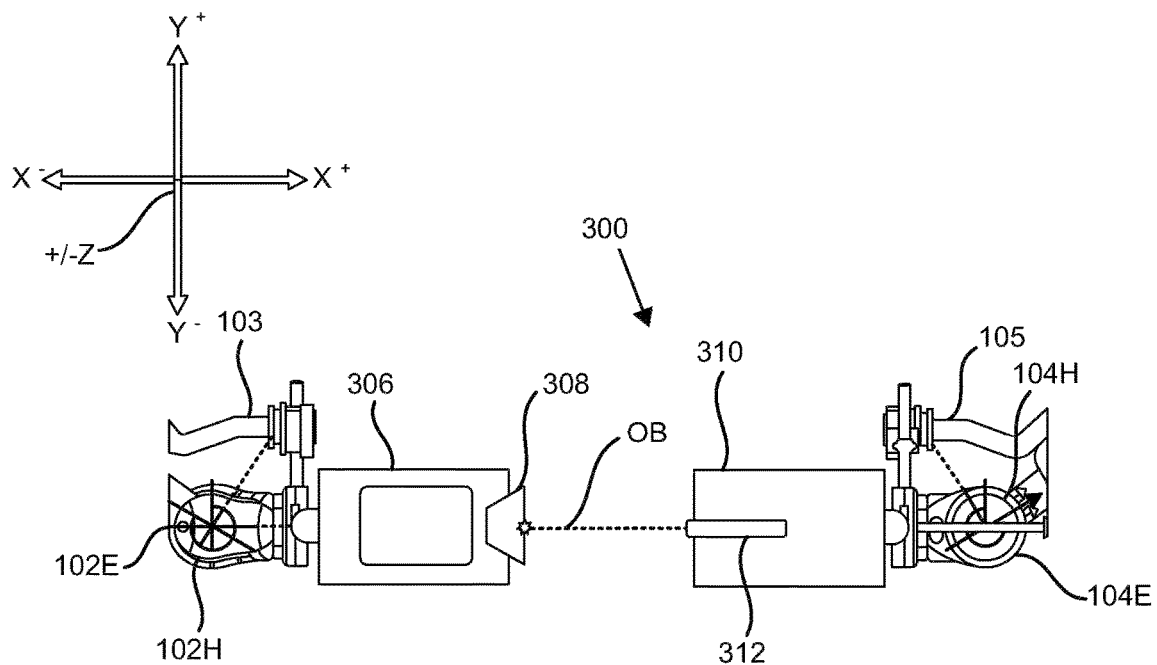
FIG. 6 is a schematic illustration of one exemplary embodiment of a calibration system.

Referring now to FIG. 6, a calibration assembly 300 for the NDT inspection system 100 is depicted. The calibration assembly 300 utilizes optical beams OB to determine the deviation at measurement points along the scan path. The calibration assembly 300 can include an end effector 306, a receiver 308, an end effector 310, and an emitter 312. In an exemplary implementation, the emitter 312 is a laser pointer and the receiver 308 is an optical sensor that detects the optical beam OB in only two dimensions. In an exemplary implementation, the emitter 312 is a laser-distance sensor which can detect a single dimension and the receiver 308 is an optical sensor that detects the optical beam OB in the remaining two dimensions. As the end effectors 306 and 310 translate along the scan path, an optical beam OB is emitted from the emitter 312 to the receiver 308. If during the calibration scan either of the end effectors 306 or 310 become misaligned, the optical beam OB will not be received by the receiver 308 at a threshold amount, causing the calibration assembly 300 to record the deviation at that measurement point in order to create the corrected scan path.

Figure 7:
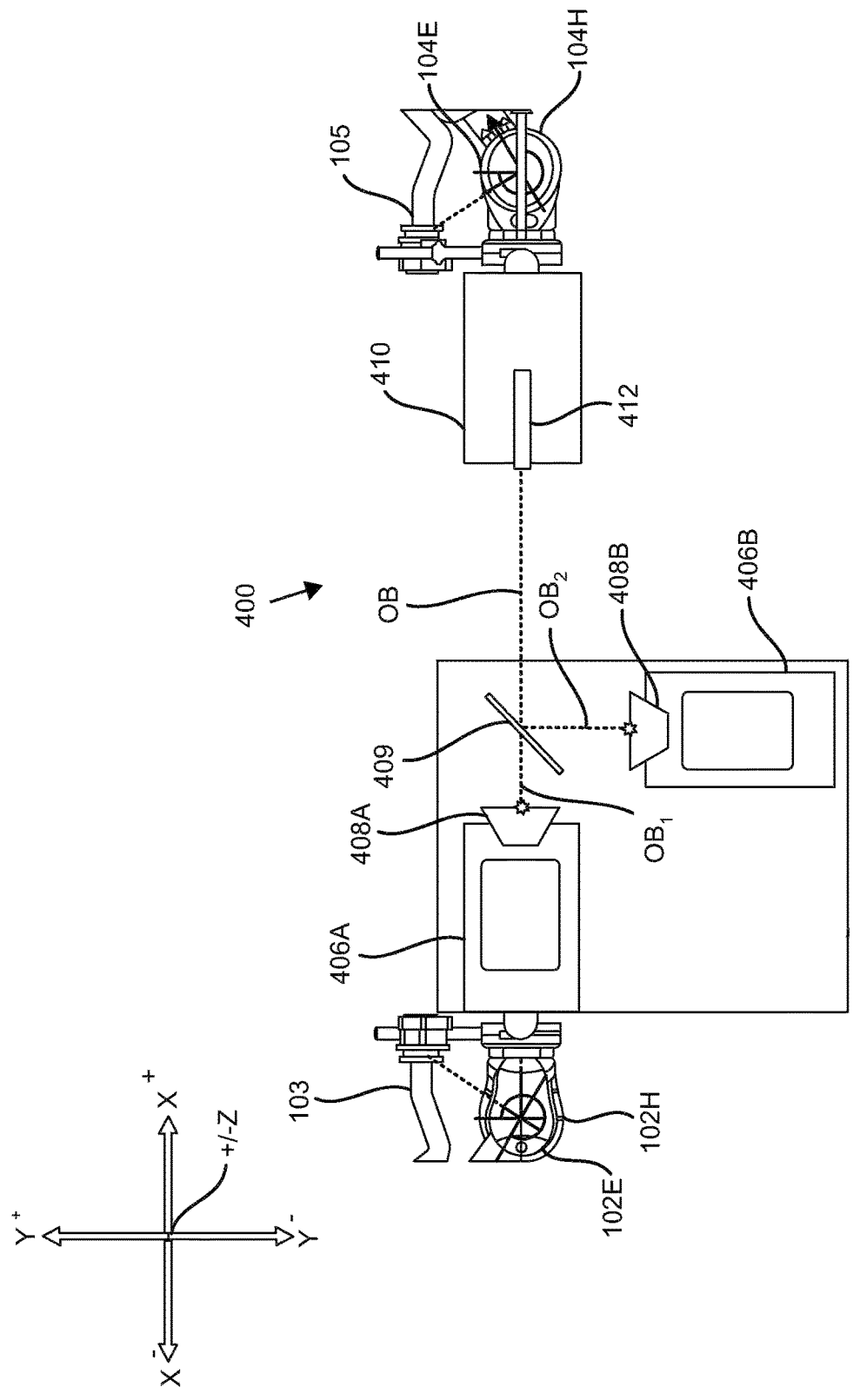
FIG. 7 is a schematic illustration of one exemplary embodiment of a calibration system.

Referring now to FIG. 7, a calibration assembly 400 for the NDT inspection system 100 is depicted. The calibration assembly 400 utilizes optical beams OB to determine the deviation at measurement points along the scan path. The calibration assembly 400 can include an end effector 406A, an end effector 406B, a receiver 408A, a transparent mirror 409, a receiver 408B, an end effector 410, and an emitter 412. In an exemplary implementation, the emitter 412 is a laser pointer and the receivers 408A and 408B are optical sensors that detect the optical beam OB. In an exemplary implementation, the emitter 412 is a laser-distance sensor which can detect a single dimension and the receivers 408A and 408B are optical sensors that detect the optical beams OB. As the end effectors 406A, 406B, and 410 translate along the scan path, an optical beam OB is emitted from the emitter 412 and contacts the mirror 409. As the optical beam OB contacts the mirror 409, a portion of the optical beam OB is reflected as optical beam $OB_1$ to the receiver 408A, and another portion of the optical beam OB passes through the mirror as optical beam $OB_2$ to the receiver 408B. If during the calibration scan either of the end effectors 406A, 406B, or 410 become misaligned, the optical beams $OB_1$ and $OB_2$ will not be received by the receivers 408A and 408B at a threshold amount, causing the calibration assembly 400 to record the deviation at that measurement point in order to create the corrected scan path.

Figure 8:
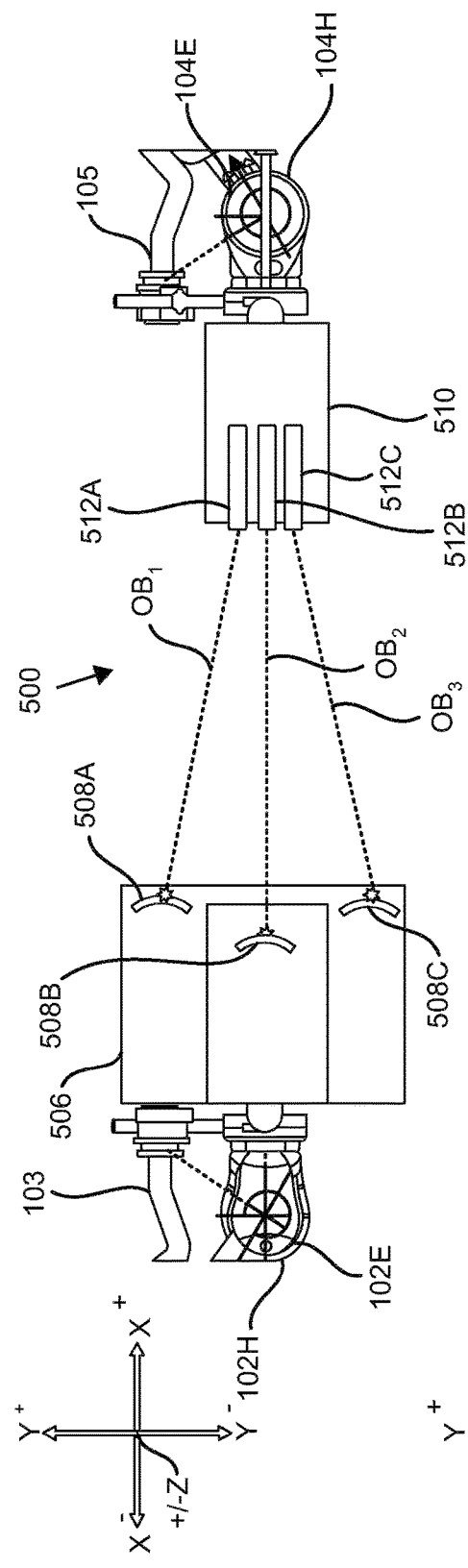
FIG. 8 is a schematic illustration of one exemplary embodiment of a calibration system.

Referring now to FIG. 8, a calibration assembly 500 for the NDT inspection system 100 is depicted. The calibration assembly 500 utilizes optical beams OB to determine the deviation at measurement points along the scan path. The calibration assembly 500 can include an end effector 506, a receiver 508A, a receiver 508B, a receiver 508C, an end effector 510, an emitter 512A, an emitter 512B, and an emitter 512C. In an exemplary implementation, the emitters 512A, 512B, and 512C are laser pointers and the receivers 508A, 508B, and 508C are optical sensors that detects the optical beams $OB_1$, $OB_2$, and $OB_3$. In an exemplary implementation, the emitters 512A, 512B, and 512C are laser-distance sensors which can detect distance, and the receivers 508A, 508B, and 508C are curved reflectors that reflect the optical beams $OB_1$, $OB_2$, and $OB_3$. As the end effectors 506 and 510 translate along the scan path, optical beams $OB_1$, $OB_2$, and $OB_3$ are emitted from the emitters 512A, 512B, and 512C to the receivers 508A, 508B, and 508C. If during the calibration scan either of the end effectors 506 or 510 become misaligned, the optical beams $OB_1$, $OB_2$, and $OB_3$ will not be received by the receivers 508A, 508B, and 508C at a threshold amount, causing the calibration assembly 500 to record the deviation at that measurement point in order to create the corrected scan path.

Figure 9:
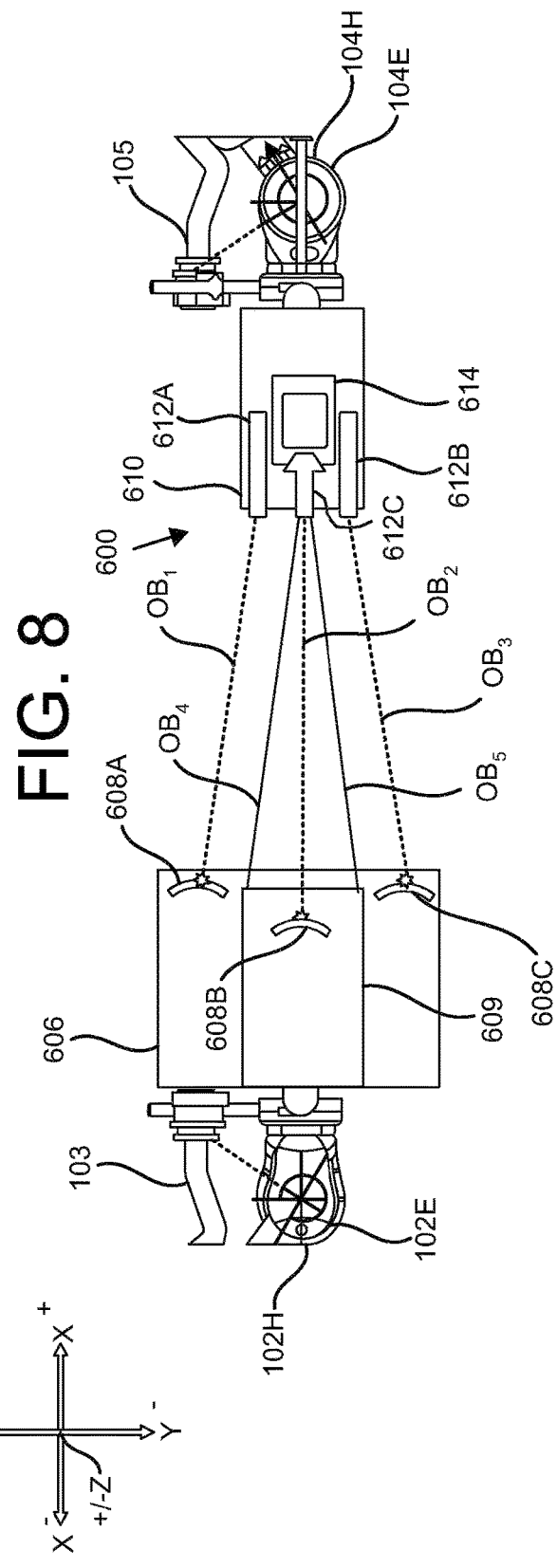
FIG. 9 is a schematic illustration of one exemplary embodiment of a calibration system.

Referring now to FIG. 9, a calibration assembly 600 for the NDT inspection system 100 is depicted. The calibration assembly 600 utilizes optical beams OB to determine the deviation at measurement points along the scan path. The calibration assembly 600 can include an end effector 606, a receiver 608A, a receiver 608B, a receiver 608C, a visual marker 609, an end effector 610, an emitter 612A, an emitter 612B, an emitter 612C, and a camera 614. In an exemplary implementation, the emitters 612A, 612B, and 612C are laser pointers and the receivers 608A, 608B, and 608C are optical sensors that detects the optical beams $OB_1$, $OB_2$, and $OB_3$. In an exemplary implementation, the emitters 612A, 612B, and 612C are laser-distance sensors which can detect distance, and the receivers 608A, 608B, and 608C are curved reflectors that reflect the optical beams $OB_1$, $OB_2$, and $OB_3$. The camera is arranged within the end effector 610 and emits optical beams $OB_4$ and $OB_5$, which are meant to aid in alignment when the optical beams $OB_4$ and $OB_5$ align with the visual marker 609. As the end effectors 606 and 610 translate along the scan path, optical beams $OB_1$, $OB_2$, and $OB_3$ are emitted from the emitters 612A, 612B, and 612C to the receivers 608A, 608B, and 608C, and the optical beams $OB_4$ and $OB_5$ are emitted from the camera 614 to the visual marker 609. If during the calibration scan either of the end effectors 606 or 610 become misaligned, the optical beams $OB_1$, $OB_2$, and $OB_3$ will not be received by the receivers 608A, 608B, and 608C at a threshold amount, causing the calibration assembly 600 to record the deviation at that measurement point in order to create the corrected scan path.

Figure 10:
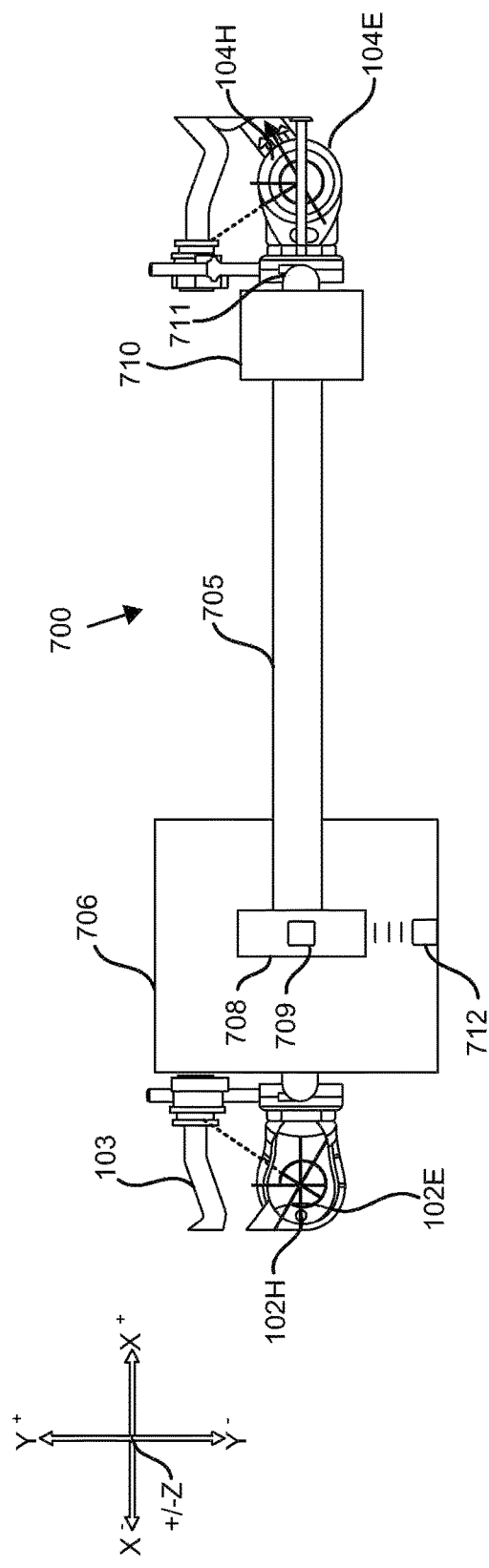
FIG. 10 is a schematic illustration of one exemplary embodiment of a calibration system.

Referring now to FIG. 10, a calibration assembly 700 for the NDT inspection system 100 is depicted. The calibration assembly 700 utilizes a mechanical coupling to determine the deviation at measurement points along the scan path. The calibration assembly 700 can include a mandrel 705, an end effector 706, a receiver 708, a linear position sensor 709, an end effector 710, and an emitter 712. As the end effectors 706 and 710 translate along the scan path, the mandrel 705 can move relative to the end effector 706, where the linear position sensor 709 is fixedly secured to the mandrel 705. The mandrel 705 is fixedly connected to the moveable arm 104E via connection 711. If during the calibration scan either of the end effectors 706 or 710 become misaligned, the emitter 712 will not align with the linear position sensor 709 since the mandrel 705 will be at a different angle compared to the end effector 706. Therefore, a signal will not pass from the emitter 712 to the liner position sensor 709 at a threshold amount, causing the calibration assembly 700 to record the deviation at that measurement point in order to create the corrected scan path.

Figure 11:
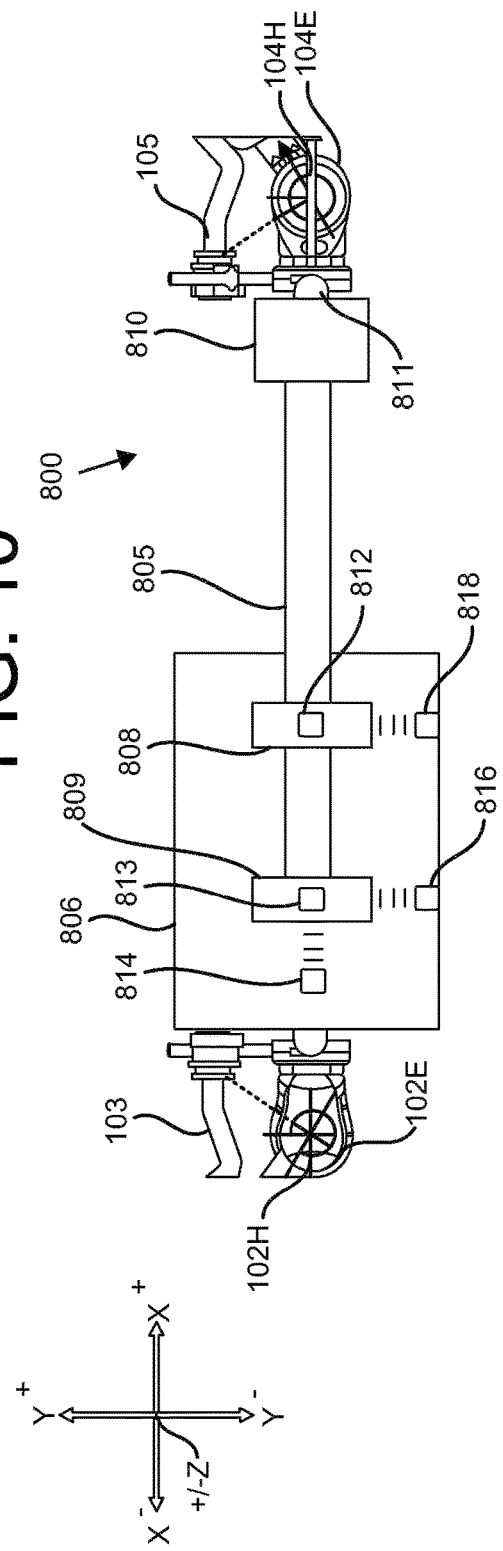
FIG. 11 is a schematic illustration of one exemplary embodiment of a calibration system.

Referring now to FIG. 11, a calibration assembly 800 for the NDT inspection system 100 is depicted. The calibration assembly 800 utilizes a mechanical coupling to determine the deviation at measurement points along the scan path. The calibration assembly 800 can include a mandrel 805, an end effector 806, a receiver 808, a receiver 809, an end effector 810, a linear position sensor 812, a linear position sensor 813, an emitter 814, an emitter 816, and an emitter 818. As the end effectors 806 and 810 translate along the scan path, the mandrel 805 can move relative to the end effector 806, where the linear position sensors 812 and 813 are fixedly secured to the mandrel 805. The mandrel 805 is fixedly connected to the moveable arm 104E via connection 811. If during the calibration scan either of the end effectors 806 or 810 become misaligned, the emitters 814 and 816 will not align with the linear position sensor 813, and the emitter 818 will not align with the linear position sensor 812 since the mandrel 805 will be at a different angle compared to the end effector 806. Therefore, a signal will not pass from the emitters 814 and 816 to the linear position sensor 813, or the emitter 818 to the linear position sensor 812 at a threshold amount, causing the calibration assembly 800 to record the deviation at that measurement point in order to create the corrected scan path.

Figure 12:
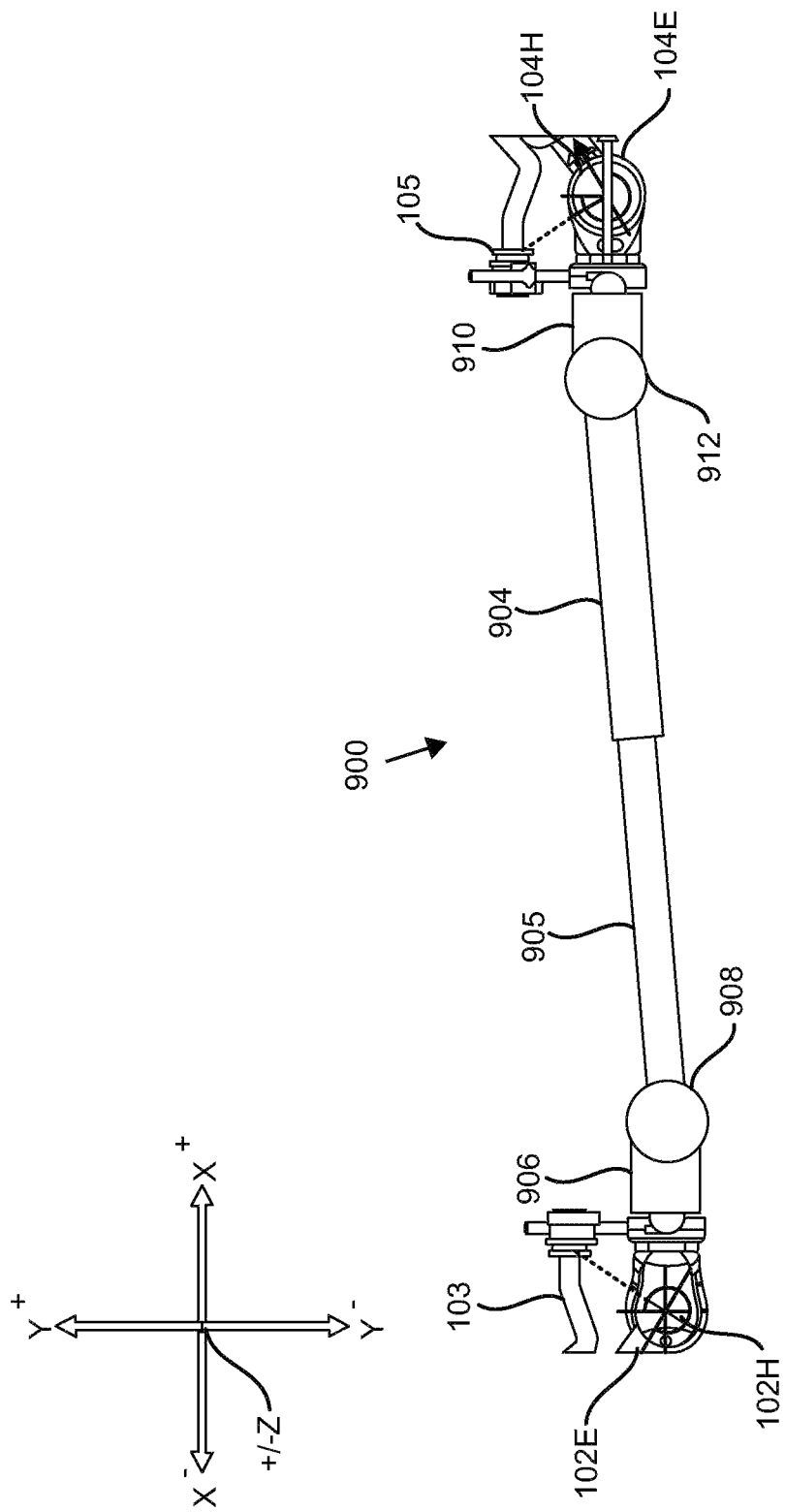
FIG. 12 is a schematic illustration of one exemplary embodiment of a calibration system.

Referring now to FIG. 12, a calibration assembly 900 for the NDT inspection system 100 is depicted. The calibration assembly 900 utilizes a mechanical coupling to determine the deviation at measurement points along the scan path. The calibration assembly 900 can include a telescoping shaft 904, an extending portion 905, an end effector 906, a receiver 908, an end effector 910, and an emitter 912. In an exemplary implementation, the receiver 908 and the emitter 912 are both angular position sensors to determine the angle the telescoping shaft 904 is arranged at. As the end effectors 906 and 910 translate along the scan path, the telescoping shaft 904 extends via extending portion 905, where the calibration system 900 measures the length of the telescoping shaft at each measurement point. If during the calibration scan either of the end effectors 906 or 910 become misaligned, the receiver 908 and the emitter 912 will measure angles which are outside a threshold limit, along with the length of the telescoping shaft 904. Therefore, the calibration assembly 900 can record the deviation at that measurement point in order to create the corrected scan path.

Figure 13:
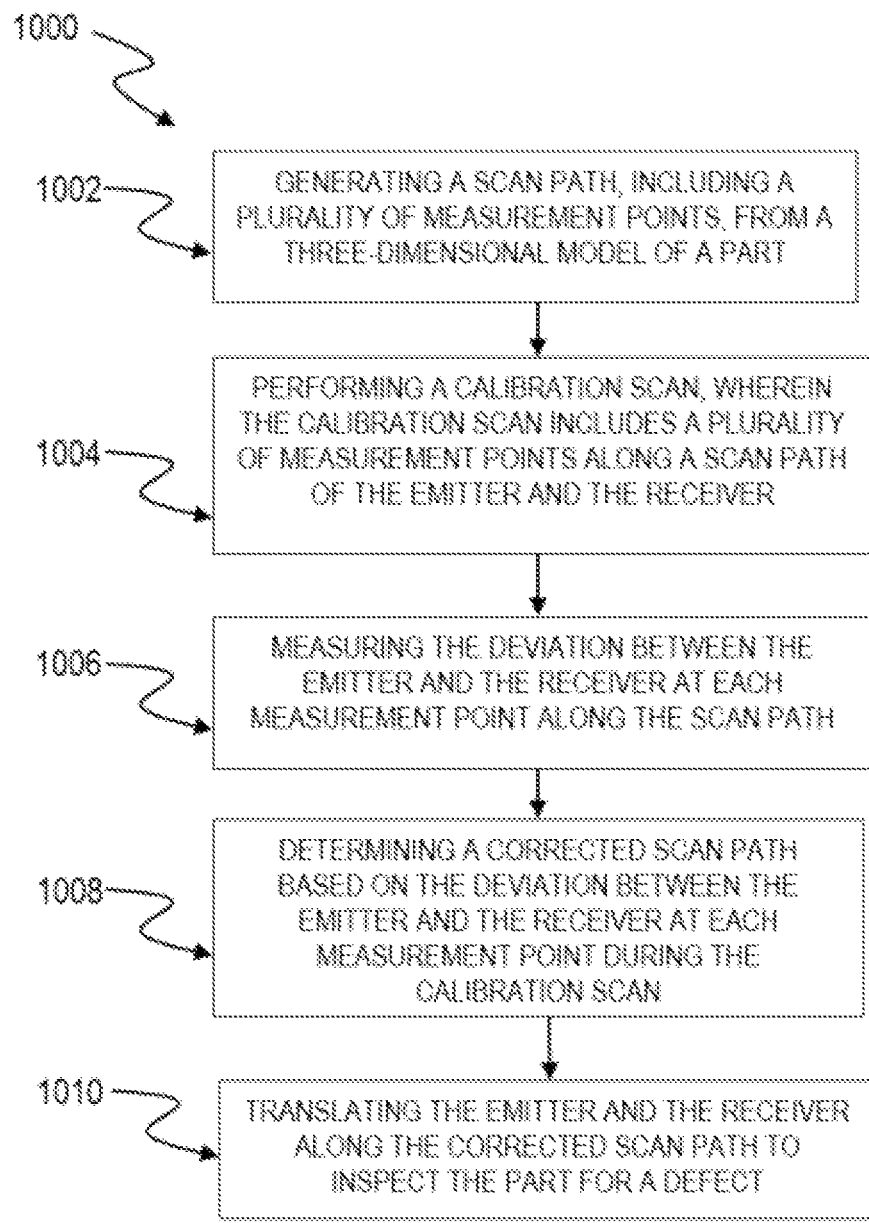
FIG. 13 is an exemplary embodiment of a method of operating the calibration systems of FIGS. 1-12.

Referring now to FIG. 13, a flow diagram of an exemplary method 1000 to operate the robotic devices of the NDT inspection system 100 during a calibration scan. Execution of these steps can ensure proper alignment of the ultrasonic tools, thereby permitting accurate transfer of the ultrasonic signals through the part 10 from one of the robot devices to the other. One or more of the steps can be coded as executable instructions that, when executed by a processor and/or computing device, cause the robot devices to execute the ultrasonic scan of the part 10.

In FIG. 13, the method 1000 includes, at step 1002, generating a scan path, including a plurality of measurement points, from a three-dimensional model of a part. The model can be a three-dimensional CAD model from a variety of design software packages, e.g., CATIA. The method 1000 also includes, at step 1004, performing a calibration scan, where the calibration scan follows the generated scan path from step 1002. The calibration scan includes the plurality of measurement points along the generated scan path of the emitter and the receiver of the calibration assembly. At step 1006, as the emitter and receiver of the calibration assembly translate along the scan path, the receiver measures the deviation between the emitter and the receiver at each measurement point along the scan path. The method 1000 further includes, at step 1008, determining a corrected scan path based on the deviation between the emitter and the receiver at each measurement point during the calibration scan.

The step for generating a scan path (e.g., at step 1002) defines the position(s) that the robot devices will locate the inspection tool relative to the part during an ultrasonic inspection scan and a calibration scan. FIG. 2 illustrates an example of scan paths 12 and 14 that results from execution of these steps. The scan paths 12 and 14 traverses the surface of a CAD model 402, which represents the part that is under inspection. The scan paths 12 and 14 include a plurality of measurement points $P_1$, $P_2$, and $P_3$ along the scan paths 12 and 14 that link the measurement points together. The measurement points define discrete locations on the surface of the part 10 where the inspection system 100 will collect data and calibrate itself during a calibration scan. Preferences for the scope and the precision of the data will dictate the number and relative spacing of the measurement points. For example, more measurement points that are close together may provide a more accurate reporting of the defects that are found in the part because the inspection system 100 collects more data during the ultrasonic inspection scan.

The step for performing a calibration scan, where the calibration scan follows the generated scan path from step 1002 (e.g., at step 1004) coordinates the scan paths 12 and 14 with the calibration assembly being used. Execution of this step takes into account the relative position of the components of the inspection system 100 and the calibration system to instruct the multi-axis robotic devices 102 and 104 as to the proper position of the emitter and receiver of the calibration assembly in relation to the calibration scan path, which is in direct relationship with the actual geometry of the part 10. This step may include a step for locating the scan path in "free space". The steps for positioning and translating the calibration assembly (e.g., at steps 1004 and 1006) move the end effectors 106 and 110 (e.g., the first end effector and the second end effector) along the scan path TA. These steps can include one or more steps to energize the various motors and actuators of the multi-axis robotic devices 102 and 104. The trajectory of the first end effector 106 and the second end effector 110 may depend on the internal software and coding of the multi-axis robotic devices 102 and 104, where such coding may determine the most efficient combination of movements of the various joints of the robotic devices 102 and 104 to position the first end effector 106 and the second end effector 110 in the correct spatial location and to maintain proper alignment for successfully passing of an ultrasonic signal through the part from the first end effector 106 to the second end effector 110. This movement along the scan path can cover the entire surface of the part 10 or, in an alternative implementation, the scan path can cover only a portion of the surface of the part 10 that is known to develop defects or flaws that are detrimental to the part 10. As discussed above, the scan path can dictate where the first end effector 106 and the second end effector 110 is positioned.

The step for measuring the deviation between the emitter and the receiver at each measurement point along the scan path as the emitter and receiver of the calibration assembly translate along the scan path (e.g., at step 1006) determines the error in aligned between the spatial location of the emitter and the receiver of the calibration assembly, and in turn the receiver 108 and the emitter 112 if not corrected before inspecting a part 10. The method 1000 further includes, at step 1008, determining a corrected scan path based on the deviation between the emitter and the receiver of the calibration assembly at each measurement point during the calibration scan. The resulting measurements can be used to determine deviations between the coordinates and/or spatial locations of the emitter and the receiver of the calibration assembly relative to the multi-axis robotic devices 102 and 104.

Correlating the calibration data with the position of the multi-axis robotic devices 102 and 104 can use data from at least one of the robotic devices that the robotic devices generate during operation. In an exemplary implementation, one or more of the multi-axis robotic devices 102 and 104 may include an encoder or other device that measures movement, position, and/or other parameters of one or more degrees for freedom. Often the information from the encoders is coordinated using one or more matrices that establish the location of the end effector and, ultimately, the emitter and receiver of the calibration assembly to the coordinate system of the robotic device 102 and 104. Embodiments of the method 1000 may include various steps for mathematical manipulation of the data that defines the position of the robotics devices 102 and 104 for use and coordination with the ultrasonic data. The step for translating the emitter and the receiver along the corrected scan path to inspect the part 10 for a defect (e.g., at step 1010) corrects any deviations within the scan path between the end effector 106 and 110.

The present disclosure is not limited to the exemplary embodiments described herein and can be embodied in variations and modifications. The exemplary embodiments are provided merely to allow one of ordinary skill in the art to understand the scope of the present disclosure, which will be defined by the scope of the claims. Accordingly, in some embodiments, well-known operations of a process, well-known structures, and well-known technologies are not be described in detail to avoid obscure understanding of the present disclosure. Throughout the specification, same reference numerals refer to same elements.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly-embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiments. Various modifications and changes can be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:

1. A non-destructive testing calibration system, comprising:
    a first multi-axis robotic device having a first end effector removably attached to a first arm of the first multi-axis robotic device;
    a second multi-axis robotic device having a second end effector removably attached to a second arm of the second multi-axis robotic device, wherein the first multi-axis robotic device can move independent of, and relative to, the second multi-axis robotic device;
    a calibration assembly, comprising:
        an emitter arranged on the first end effector; and
        a receiver arranged on the second end effector, wherein the emitter and the receiver are positioned on opposite sides of the calibration assembly;
    at least one data processor; and
    a memory storing instructions, which when executed by at the least one data processor causes the at least one data processor to perform operations comprising:
        generating a scan path of the emitter and the receiver,
        localizing the scan path in free space, wherein the scan path identifies locations of the emitter and the receiver in the free space,
        performing a calibration scan at a plurality of ideal measurement points along the scan path of the emitter and the receiver, the calibration scan including commanding the emitter to emit a calibration signal and detecting the calibration signal by the receiver;
        measuring, for each ideal measurement point along the scan path, a deviation between a location at which the calibration signal is incident upon on a receiving surface of the receiver and a location of the ideal measurement point with respect to the receiving surface; and
        determining a corrected scan path based on the deviation measured at each ideal measurement point during the calibration scan, wherein the instructions are configured to cause the first multi-axis robotic device and the second multi-axis robotic device to maintain alignment between the emitter and the receiver as the emitter and the receiver translates along the corrected scan path.

2. The non-destructive testing calibration system of claim 1, wherein the corrected scan path includes a first corrected spatial location for the emitter and a second corrected spatial location for the receiver for each measurement point along the scan path.

3. The non-destructive testing calibration system of claim 1, wherein the emitter is an ultrasonic transducer and the receiver is an ultrasonic receiver.

4. The non-destructive testing calibration system of claim 3, wherein the first end effector and the second end effector are configured to generate a fluid stream to couple an ultrasonic signal from the emitter to the receiver.

5. The non-destructive testing calibration system of claim 1, wherein the emitter is a laser and the receiver is an optical sensor.

6. The non-destructive testing calibration system of claim 1, wherein the emitter includes a laser-distance sensor and the receiver includes a reflector.

7. The non-destructive testing calibration system of claim 1, wherein the emitter includes a laser-distance sensor and a camera, and the receiver includes a reflector and a visual marker.

8. The non-destructive testing calibration system of claim 1, wherein the emitter includes a mandrel extending to the receiver, and the receiver includes a linear position sensor.

9. The non-destructive testing calibration system of claim 1, wherein the first end effector is connected to the second end effector via a telescoping rod, wherein the telescoping rod is rotatably coupled to the first end effector via a first rotation sensor and the second end effector via a second rotation sensor.

10. The non-destructive testing calibration system of claim 1, wherein the first multi-axis robotic device and the second multi-axis robotic device have six degrees of freedoms.

11. The non-destructive testing calibration system of claim 1, wherein the emitter and the receiver are configured to be translated along the corrected scan path to inspect a body for a defect.

12. A method of calibrating a non-destructive testing system, comprising:
generating a scan path of an emitter and a receiver;
localizing the scan path in free space, the scan path identifying locations of the emitter and the receiver in the free space;
performing a calibration scan via the emitter and the receiver, wherein the calibration scan includes a plurality of ideal measurement points along the scan path of the emitter and the receiver, and the emitter is arranged on a first multi-axis robotic device with a first end effector removably attached to a first arm of the first multi-axis robotic device and the receiver is arranged on a second multi-axis robotic device with a second end effector removably attached to a second arm of the second multi-axis robotic device, wherein the first multi-axis robotic device can move independent of, and relative to, the second multi-axis robotic device;
measuring, for each ideal measurement point along the scan path, a deviation between a location at which the calibration signal is incident upon on a receiving surface of the receiver and a location of the ideal measurement point with respect to the receiving surface; and
determining a first corrected spatial location for the emitter and a second corrected spatial location for the receiver for each ideal measurement point along the scan path based on the measured deviation, wherein the first multi-axis robotic device and the second multi-axis robotic device are configured to maintain alignment between the emitter and the receiver as the emitter and the receiver translates along the corrected scan path.

13. The method of claim 12, wherein the corrected scan path includes a first corrected spatial location for the emitter and a second corrected spatial location for the receiver for each measurement point along the scan path.

14. The method of claim 12, wherein the emitter is an ultrasonic transducer and the receiver is an ultrasonic receiver.

15. The method of claim 14, wherein the first end effector and the second end effector are configured to generate a fluid stream to couple an ultrasonic signal from the emitter to the receiver.

16. The method of claim 12, wherein the emitter is a laser and the receiver is an optical sensor.

17. The method of claim 12, wherein the emitter includes a laser-distance sensor and the receiver includes a reflector.

18. The method of claim 12, wherein the emitter includes a laser-distance sensor and a camera, and the receiver includes a reflector and a visual marker.

19. The method of claim 12, wherein the emitter includes a mandrel extending to the receiver, and the receiver includes a linear position sensor.

20. The method of claim 12, wherein the emitter and the receiver are configured to be translated along the corrected scan path to inspect a body for a defect.

* * * * *